(12) United States Patent
Vedagiri et al.

(10) Patent No.: US 11,754,228 B2
(45) Date of Patent: Sep. 12, 2023

(54) DRY VAPORIZER

(71) Applicants: Sriram Vedagiri, Navi Mumbai (IN);
V. Sudarshan Chandrasekhar, Navi Mumbai (IN)

(72) Inventors: Sriram Vedagiri, Navi Mumbai (IN);
V. Sudarshan Chandrasekhar, Navi Mumbai (IN)

( * ) Notice: Subject to any disclaimer, the term of this patent is extended or adjusted under 35 U.S.C. 154(b) by 0 days.

(21) Appl. No.: 16/647,435

(22) PCT Filed: Sep. 11, 2019

(86) PCT No.: PCT/IN2019/050657
§ 371 (c)(1),
(2) Date: Mar. 24, 2020

(87) PCT Pub. No.: WO2020/053885
PCT Pub. Date: Mar. 19, 2020

(65) Prior Publication Data
US 2021/0215297 A1    Jul. 15, 2021

(30) Foreign Application Priority Data

Sep. 12, 2018 (IN) .............................. 201821034308

(51) Int. Cl.
*F17C 13/02* (2006.01)
*F17C 7/00* (2006.01)

(52) U.S. Cl.
CPC .............. *F17C 7/00* (2013.01); *F17C 13/026* (2013.01); *F17C 2201/0109* (2013.01); *F17C 2201/035* (2013.01); *F17C 2221/035* (2013.01); *F17C 2223/0153* (2013.01); *F17C 2227/0393* (2013.01); *F17C 2250/0439* (2013.01)

(58) Field of Classification Search
CPC .. F17C 7/00; F17C 13/026; F17C 2201/0109; F17C 2201/035; F17C 2221/035; F17C 2223/0153; F17C 2227/0393; F17C 2250/0439; F17C 2201/054; F17C 2223/033; B01D 1/0094; B01D 1/0082
USPC ........................................................ 62/50.2
See application file for complete search history.

(56) References Cited

U.S. PATENT DOCUMENTS

| 2,502,588 | A |   | 4/1920 | Preston et al. |
| 2,308,861 | A | * | 1/1943 | Clifford ............... G05D 23/128 251/86 |
| 2,843,717 | A | * | 7/1958 | Tracy ..................... F24H 1/103 392/494 |
| 2,981,278 | A | * | 4/1961 | Bergson .................. F16K 49/00 137/340 |

(Continued)

FOREIGN PATENT DOCUMENTS

EP          0012758 B1     1/1984

*Primary Examiner* — Jason K Niesz
(74) *Attorney, Agent, or Firm* — Rumit Ranjit Kanakia

(57) ABSTRACT

A dry vaporizer, the dry vaporizer including a plurality of passages for accommodating a heating means each, at least two channels passing through the body wherein the channels are configured for passing a vaporized fluid, and a thermostat expansion valve configured to operate based on temperature of the body. The heating means are removable heaters placed in three passages of the body arranged in an equilateral triangle to enable equal heat distribution in the body and a method thereof.

9 Claims, 5 Drawing Sheets

(56) References Cited

U.S. PATENT DOCUMENTS

| | | | | |
|---|---|---|---|---|
| 3,184,295 | A * | 5/1965 | Baverstock | G05D 16/185 48/184 |
| 3,379,256 | A * | 4/1968 | Alexander | E21B 36/04 166/60 |
| 3,402,566 | A * | 9/1968 | Leimbach | F25B 41/20 62/197 |
| 3,475,916 | A * | 11/1969 | Smith | F17C 13/02 62/50.2 |
| 3,822,956 | A * | 7/1974 | Wirtgen | E01C 23/088 404/95 |
| 4,032,070 | A * | 6/1977 | Nielsen | F25B 41/31 236/92 B |
| 4,255,646 | A * | 3/1981 | Dragoy | F17C 7/04 137/341 |
| 4,364,238 | A * | 12/1982 | Huelle | F25B 41/20 62/217 |
| 4,386,584 | A * | 6/1983 | Calkins | G05D 23/022 123/41.08 |
| 4,754,741 | A * | 7/1988 | Houtman | F02M 31/125 123/552 |
| 4,978,832 | A * | 12/1990 | Rubin | F17C 7/04 392/400 |
| 5,010,868 | A * | 4/1991 | Clements | G05D 16/0663 123/527 |
| 5,036,825 | A * | 8/1991 | Stone | F17C 7/04 137/486 |
| 5,483,943 | A * | 1/1996 | Peters | G05D 16/0663 123/527 |
| 6,584,998 | B1 * | 7/2003 | Milner | F17C 7/04 137/486 |
| 6,816,669 | B2 * | 11/2004 | Zimmer | F17C 13/04 392/397 |
| 7,021,329 | B2 * | 4/2006 | Hyde | F16K 49/002 137/341 |
| 7,347,057 | B1 * | 3/2008 | Garrabrant | F25B 49/043 62/148 |
| 8,307,843 | B2 * | 11/2012 | Patterson | G05D 16/0663 137/340 |
| 10,151,224 | B2 * | 12/2018 | Ebner | G05D 23/022 |
| 10,989,455 | B1 * | 4/2021 | Sykes | F25B 41/34 |
| 2010/0258552 | A1 | 10/2010 | Zhao | H05B 3/286 219/546 |
| 2016/0178187 | A1 * | 6/2016 | Taguchi | F22B 1/282 392/397 |
| 2021/0177197 | A1 * | 6/2021 | Streeck | H05B 1/0252 |

* cited by examiner

DRY VAPORIZER

FIELD OF THE INVENTION

The present invention relates to vaporizing systems and methods.

BACKGROUND

Vaporizers are generally well known for commercial applications. Essentially, vaporizer is a boiler that does not build additional pressure but provides protection against the refrigeration affect that causes frosting and loss of pressure. Vaporizers are an integral component in a variety of LPG and propane systems and are suitable for any number of applications.

Transportation and storage of LPG is done as liquid under pressure. To use LPG in a storage vessel (cylinder or tank) it must undergo a phase change (vaporization) from liquid to vapor within the cylinder, before being combusted by the consuming equipment (BBQ, radiant heater, boiler, process burner, etc.). The rate of natural vaporization in a tank is essentially a function of factors like ambient temperature, tank size and fill level ("wetted" tank surface area). Each piece of LPG consuming equipment has its own requirements as to the amount of vapor that it needs to run properly.

While natural vaporization is often adequate for domestic and light commercial applications, it is typically inadequate for commercial and industrial needs. Larger LPG consuming equipment often requires more vapor than natural vaporization can provide.

Some of the existing vaporizers used in restaurants include multiple units joined together. Such vaporizers have the problem of leakage and less heat transfer in case the multiple units disintegrate or wear out. Also, the vaporizers are bulky with non-uniform structures for distribution of heat.

In view of the above, there exists a need of providing improved vaporizers.

SUMMARY OF THE INVENTION

According to an embodiment, the present invention provides a dry vaporizer. The vaporizer includes a body having a plurality of passages for accommodating a heating means each, at least two channels passing through the body wherein the channels are configured for passing a vaporized fluid, and a thermostat expansion valve configured to operate based on temperature of the body.

In an embodiment the present invention provides a method of vaporizing. The method includes the steps of heating a body of a dry vaporizer by at least one heating means wherein a plurality of passages accommodate a heating means each, opening a thermostat valve after achieving a threshold temperature on heating, and passing a fluid through at least two channels provided in the body after the valve opens to allow entry inside the body channels, wherein the fluid converts to vapor when passing through the channels due to heated body.

DESCRIPTION OF THE INVENTION

Figure 1:
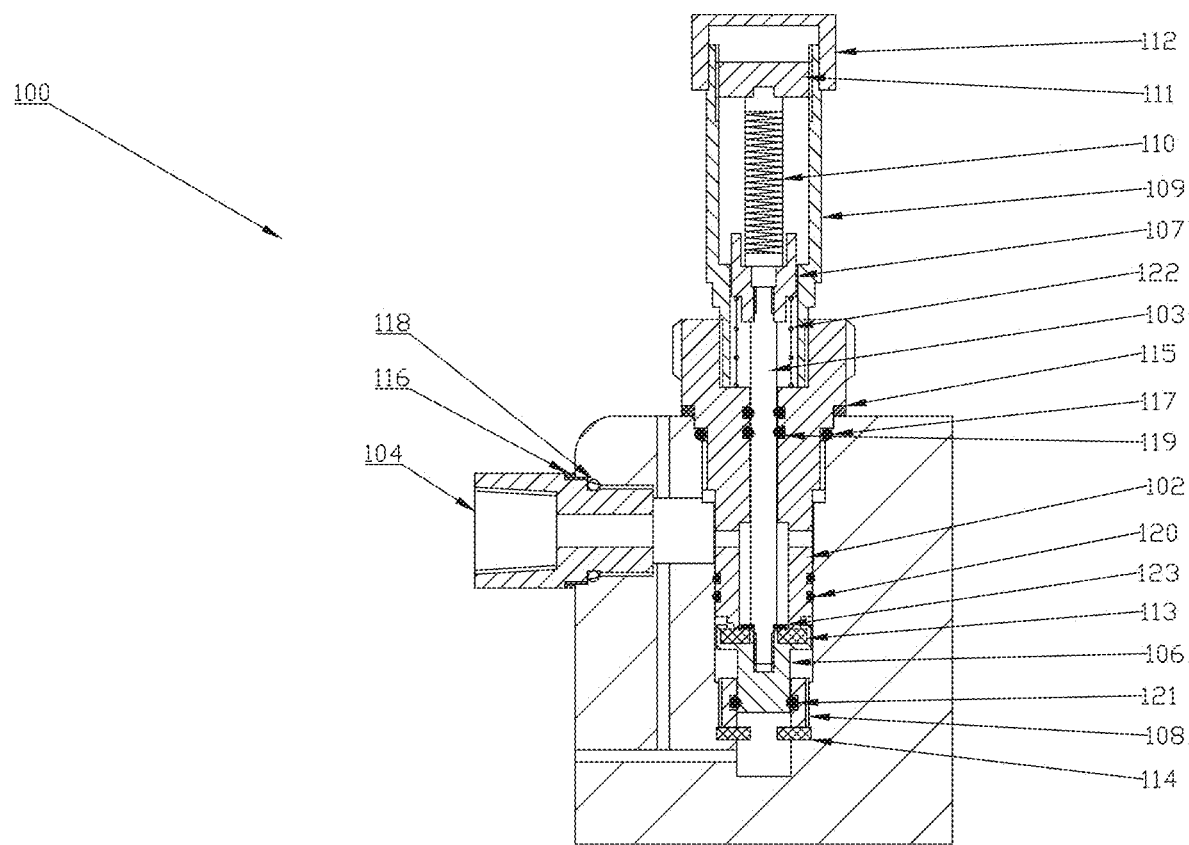
FIG. 1 shows a cross section view of a dry vaporizer in accordance with an embodiment of the present invention.

Various embodiment of the present invention provides vaporizer system and methods. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

It will be understood that when an element or layer is referred to as being on," "connected to," or coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "valve," "sensors," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views but include modifications in configurations formed on the basis of manufacturing process. Therefore, regions exemplified in the figures have schematic properties and shapes of regions shown in the figures exemplify specific shapes or regions of elements, and do not limit the various embodiments including the example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to Dry Vaporizer.

Figure 1A:
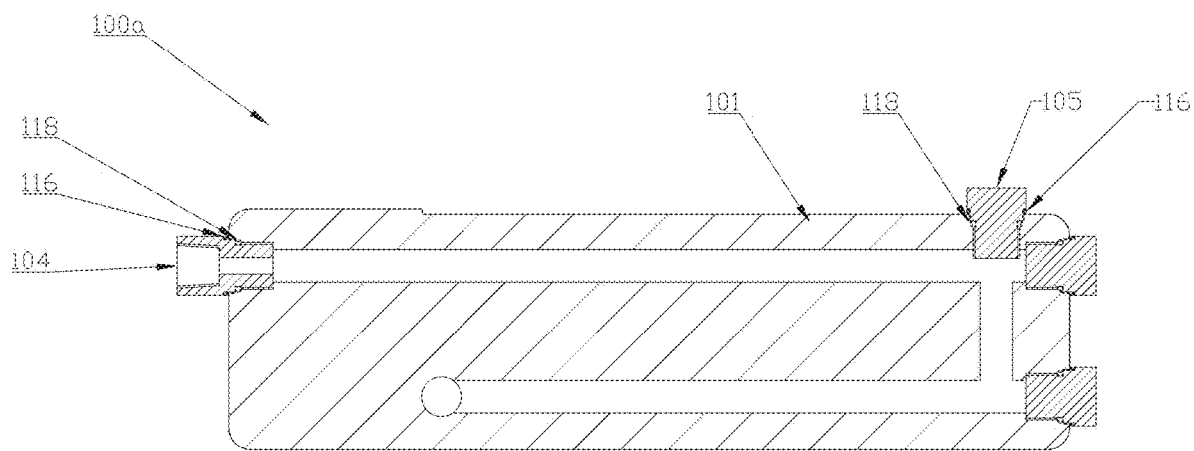
FIG. 1a shows a side section view of the dry vaporizer in accordance with an embodiment of the present invention.

Referring to FIGS. 1 and 1a provides dry vaporizer (100, 100a) in accordance with an embodiment of the present invention. The vaporizer 100 includes a body 101, valve body 102, a spindle 103, a connector 104, a plug 105, a seat 106, a spring guide 107, a bonnet 108, a bellows housing 109, a thermostat bellows 110, a bellows bonnet 111, a cap 112, a rubber seat 113, a first rubber washer 114 for bonnet, a second rubber washer 115 for valve, a third rubber washer 116 for plug, a first O-ring 117 for valve, a second O-ring 118 for plug, a third O-ring 119 for spindle, a fourth O-ring 120 for valve wall, a fifth O-ring 121 for bonnet, a spring 122, a brass washer 123, and at least one heater 124.

Figure 1B:
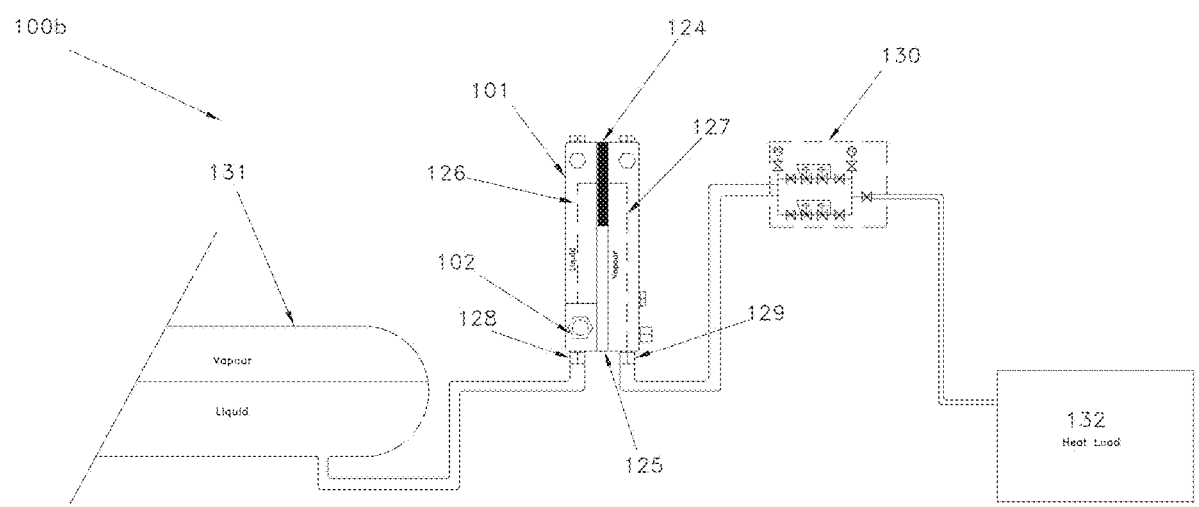
FIG. 1b shows a block view of a dry vaporizer system in accordance with an embodiment of the present invention.
Figure 1C:
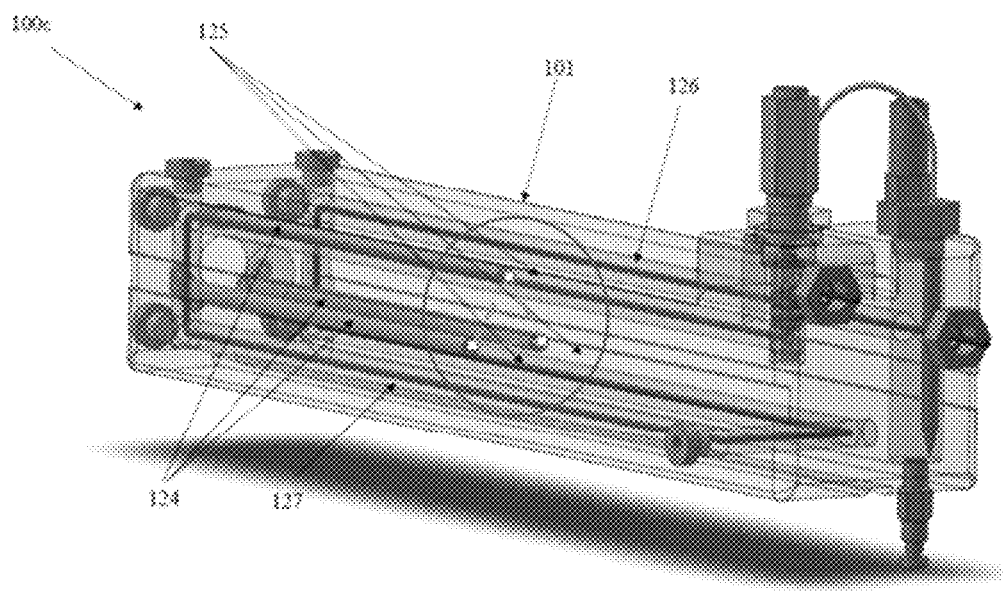
FIG. 1c shows a perspective view of the dry vaporizer in accordance with an embodiment of the present invention.

Referring to FIGS. 1b and 1c, the present invention generally provides a vaporizer 100b in accordance with an embodiment of the present invention. The vaporizer 100b includes a body (101) having a plurality of passages (125) for accommodating a heating means (124) each, at least two channels (126, 127) passing through the body (101) where the channels (126, 127) are configured for passing a vaporized fluid, and the thermostat expansion valve (102) configured to operate based on temperature of the body. The vaporizer (100b) also includes a liquid inlet (128), vapour outlet (129) and a pressure regulating station (130). The vaporizer (100b) further includes a tank (131) with mixed liquid and vapour for passing through the channels and a heat load (132) after the regulating station (130).

In a preferred embodiment, as shown in FIG. 1, 1a, 1b and 1c, the heater 124 as a heating means is removable heating means of cylindrical shape. However, it shall be apparent to a person skilled in the art that the heating means can of other geometrical shapes without departing from the scope of the invention.

In an embodiment, a thermostat sensor 133 senses temperature at an outlet of the vaporizer 100.

In an embodiment, the thermostat bellows 110 allows expansion valve 102 at inlet of the vaporizer 100 to open for enabling vaporized fluid to flow through channels (126, 127) of the body 101 when temperature reaches 69° C.

In a preferred embodiment, the body 101 is a single aluminum block. However, it shall be apparent to a person skilled in the art that the material of the block can be any other material capable of heat transfer.

In a preferred embodiment, the at least two channels (126, 127) carrying the vapor are U shaped channels encompassing sides of the block, where heaters are provided at center of the body of the vaporizer.

In an embodiment, the passages 125 for heaters 124 are provided at center of the body (101) thereby enabling equal heat distribution to the channels (126, 127) for converting fluid to vapor. In a preferred embodiment the passages (126, 127) are of cylindrical shape configured to accommodate the heater 124.

In an embodiment, the body includes three passages arranged in an equilateral triangle configuration across longitudinal axis of the body with the heaters placed inside each of the passages to enable equal heat distribution.

In an embodiment the present invention provides multiple holes for creating the channels and passages in the vaporizer.

In an advantageous aspect, certain holes are packed by plugs to give one single path to LPG flow.

In an embodiment, brass valve is fitted at the inlet which will be operated by capillary thermostat.

In an embodiment, thermostat sensor is placed at the outlet into a thermowell.

In an embodiment, a pop action valve is provided.

In an embodiment, a conduit is provided at the back side of heater to carry the heaters wires.

In an embodiment, a Junction box is fitted after the conduit.

Figure 2:
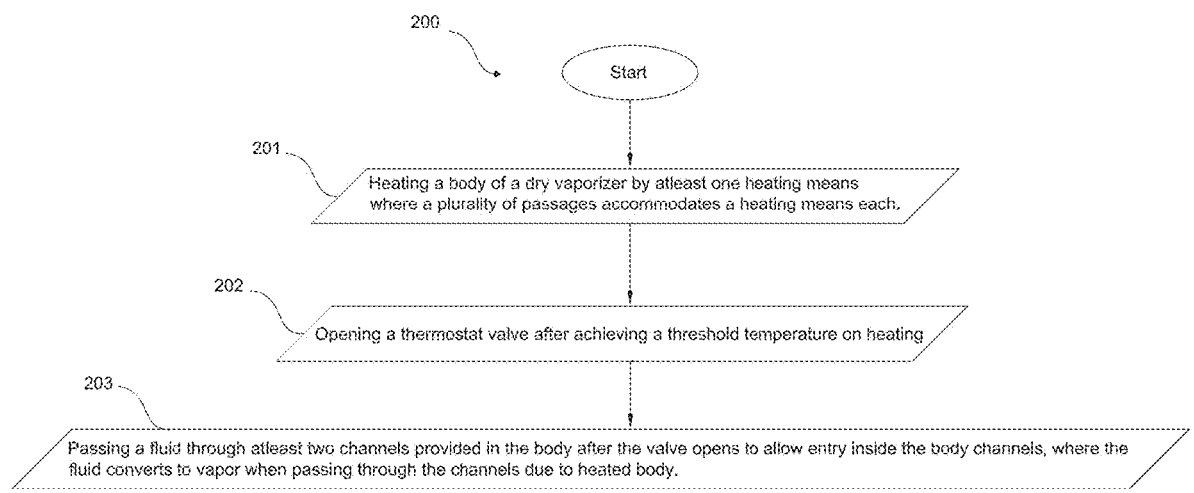
FIG. 2 shows a flowchart depicting a method of vaporizing using the dry vaporizer in accordance with an embodiment of the present invention.

Referring to FIG. 2, a flowchart 200 depicting a method of vaporizing using a dry vaporizer is shown in accordance with an embodiment of the present invention. The method includes the steps of S201 heating a body of a dry vaporizer by at least one heating means where a plurality of passages accommodates a heating means each. In S202 opening a thermostat valve after achieving a threshold temperature on heating, and in S203 passing a fluid through at least two channels provided in the body after the valve opens to allow entry inside the body channels, where the fluid converts to vapor when passing through the channels due to heated body.

In an embodiment of the present invention, when the heaters are off, the valve is in closed position. When the system is in ON condition the heaters will heat the aluminum body.

In an embodiment, a thermostat sensor senses the temperature at outlet and when the temperature reaches 69° C. the thermostatic bellows allows the inlet valve to open. LPG flows through the body of the vaporizer and due to the high temperature of body the LPG is vaporized In an embodiment of the present invention, when the temperature drops below 69° C. the passage to LPG will be stopped by means of valve.

In another embodiment, if there is much higher drop of LPG per hours than the rated capacity the valve will be closed.

In an advantageous aspect, the vaporizer of the present invention is a single piece compact and light weight vaporizer configured to be accommodated for application at any industrial, household or commercial premises like food courts, restaurants, bakeries, pharmaceutical industry, construction sites (coal tar mixing plants) etc. The vaporizer provides equal distribution of heat and precise temperature control to monitor and operate the vaporizer in efficient manner.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A dry vaporizer comprising:
   a body that is a single block including a plurality of passages for accommodating a heating means;
   at least two channels passing through the body wherein the channels are configured for passing a vaporized fluid, and
   a thermostat expansion valve configured to operate based on a temperature of the body, wherein the heating means are removable heaters placed in three passages of the body that are arranged as an equilateral triangle across a longitudinal axis with the heaters placed inside each of the passages to enable equal heat distribution.

2. The vaporizer of claim 1, wherein the body is made up of aluminium.

3. The vaporizer of claim 1, wherein the passages for heaters are provided at center of the body thereby enabling equal heat distribution to the channels for converting fluid to vapor.

4. The vaporizer of claim 1, further comprising a thermostat sensor for sensing temperature at an outlet of the vaporizer.

5. The vaporizer of claim 4, further comprising a thermostat bellows that allows the thermostat expansion valve at an inlet of the vaporizer to open for enabling vaporized fluid to flow through the channels of the body.

6. A method of vaporizing comprises the steps of:
   heating a body that is a single block of a dry vaporizer by at least one heating means wherein the heating means are removable heaters placed in three passages of the body that are arranged as an equilateral triangle across a longitudinal axis with the heaters placed inside each of the passages to enable equal heat distribution;

opening a thermostat valve after achieving a threshold temperature on heating; and passing a fluid through at least two channels provided in the body after the valve opens to allow entry inside the body channels, wherein the fluid converts to vapor when passing through the channels due to the heated body.

7. The method of claim 6, further comprising a thermostat sensor for measuring temperature of the vaporizer body.

8. The method of claim 6, wherein the thermostat valve opens when the temperature of the body reaches 69° C.

9. The method of claim 8, wherein the thermostat sensor senses the temperature at an outlet of the body wherein when the temperature reaches 69° C. a thermostatic bellows will allow an inlet valve to open, and the fluid will flow through the body.

\* \* \* \* \*